Dec. 6, 1966 E. J. SCHNEBERGER ET AL 3,290,494

BINARY ADDITION APPARATUS

Filed Feb. 13, 1963

INVENTORS
EDWARD J. SCHNEBERGER
MILTON G. BIENHOFF
BY
Samuel Lindenberg
ATTORNEY 3,290,494

BINARY ADDITION APPARATUS

Edward J. Schneberger and Milton G. Bienhoff, Canoga Park, Calif., assignors, by mesne assignments, to The Bunker Ramo Corporation, a corporation of Maryland Filed Feb. 13, 1963, Ser. No. 258,281
5 Claims. (Cl. 235—175)

Figure 1:
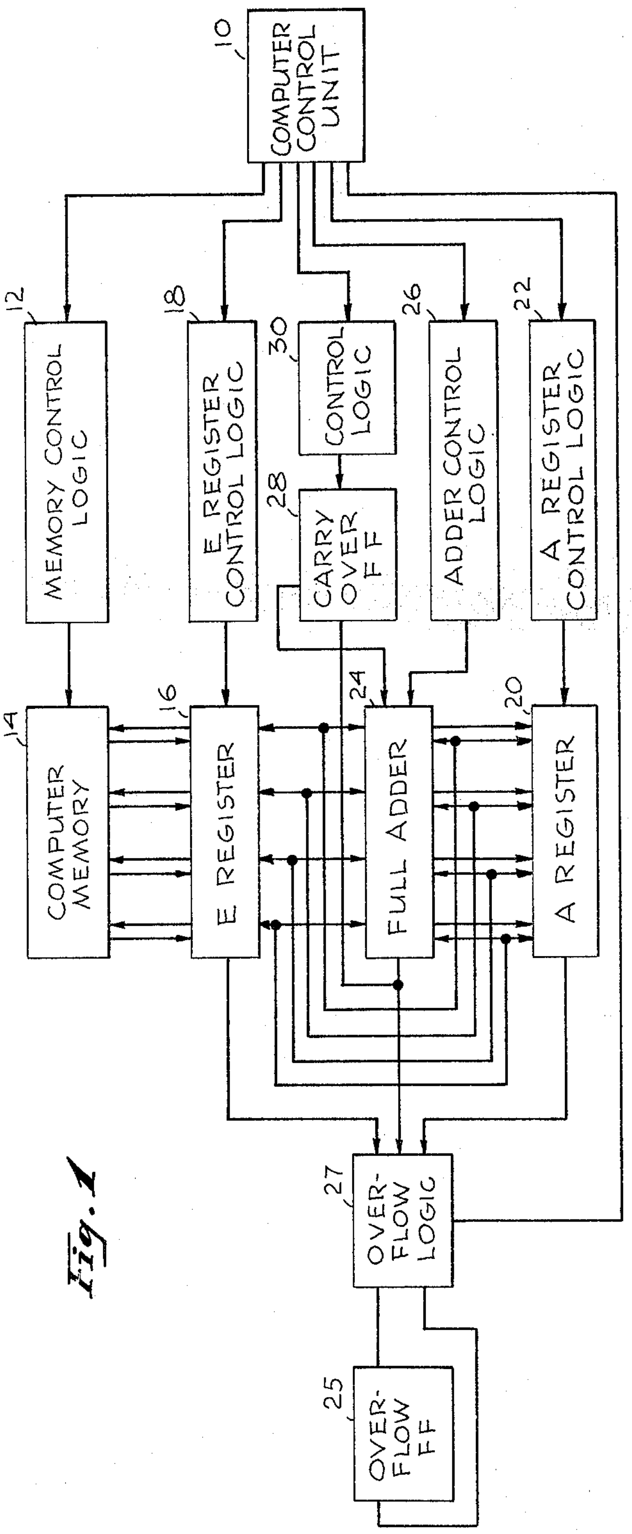

This invention relates to arithmetic apparatus of the type employed in digital computers and more particularly, to improved means for performing addition.

Information in digital computers is most often represented in some type of binary code wherein the elemental information unit is a binary digit or bit. Each bit is permitted to have one of only two possible values which are generally represented as "0" or "1." The significance of any particular bit generally depends upon its position in a group of bits, the group generally being referred to as a computer word. Computer operation usually involves the handling of two types of words, i.e. instruction words and data words. The information content of instruction words serves to control the operations of the computer performed upon the data words. All of the bits in a data word are generally stored in a single memory location and are identically handled. More particularly, all of the bits of a single data word, which can, for example, represent a numerical quantity, are simultaneously accessed from memory in a parallel computer or are accessed in a single word time in a serial computer and are identically utilized in, for example, an arithmetic operation.

Most digital computers utilize words of a fixed word length where word length is defined as a number of digits (binary, decimal or otherwise) in a word. In certain instances, the length of a single computer word may not be long enough to adequately express a numerical quantity. For example, it may sometimes be desirable to represent a greater number of significant digits of a numerical quantity than is possible if the numerical quantity had to be fully represented by a single computer word. In such instances, it has become common practice to employ two or more computer words to represent the single numerical quantity with the desired precision.

In order to perform arithmetic operations, such as addition, on quantities represented by more than one computer word, programmed logical operations have been required to handle any carry digits which had to be added to succeeding words. As an example of this, consider a binary coded decimal computer having a fixed word length of four bits. Assume that it is desired to add the quantities 35 and 47. Each of these respective digits (i.e. 3, 5, 4, 7) is stored in a single memory location. As an initial step in the addition, signals representing the units digits, namely 5 and 7, are entered into the adder circuit of the computer resulting in the development of a sum of 12. The 2, or units digit, of the sum 12 is then stored and the 1 or tens digit, must be carried over and added to the next sum developed; i.e., the sum of the tens digits (3 and 4).

The precise steps involved in handling an inter-word carry digit of this type has heretofore been determined by a computer program; i.e. a sequence of instruction words. More particularly, in heretofore known computers the carry digit is entered into a carry over flip-flop and before performing the addition of the tens digits (3 and 4), sensing circuitry senses the contents of the carry over flip-flop. If a carry digit is present, then the carry digit together with one of the next two digits to be added (3 or 4) is applied to the adder to develop an intermediate sum. Then the remaining tens digit (3 or 4) together with the intermediate sum is entered into the adder circuit and the output of the adder circuit is stored as the final tens digit. The procedure just described is repeated if higher order digits are to be added.

It should be apparent that the programmed handling of such an inter-word carry digit requires the expenditure of programming time and the handling of the carry digit entails a delay in the addition, inasmuch as the contents of the carry over flip-flop must be sensed and added to another digit to develop an intermediate sum and that sum must then be added to the remaining digit to complete the addition.

In view of this, it is an object of the present invention to provide an arithmetic apparatus which automatically handles inter-word carry digits.

It is an additional object of this invention to provide an arithmetic apparatus which can more efficiently and therefore less expensively perform addition operations.

These and other objects of the present invention are achieved in a preferred embodiment by properly controlling a carry-over flip-flop employed in conjunction with a conventional adder circuit. Provision is made so that the carry over flip-flop is cleared prior to the addition of the two least significant words or digits. Upon addition of the two least significant words, the carry digit, if any, is stored in the carry over flip-flop. Thereafter, i.e., for the addition of any but the least significant words, the carry over flip-flop is not precleared, but instead its contents are automatically added into subsequent additions. Stated otherwise, by always automatically applying the contents of a carry over flip-flop to an adder circuit and by clearing the flip-flop only prior to the addition of the two least significant words to be added, sensing and temporary storage steps normally required to effect such additions are eliminated.

Although the exemplary computer disclosed herein has a word length of four bits and may be considered a parallel binary coded decimal computer, it is to be understood that the invention is applicable to a digital computer, be it parallel or serial, having any word length and utilizing any number system or type of coding.

Figure 2:
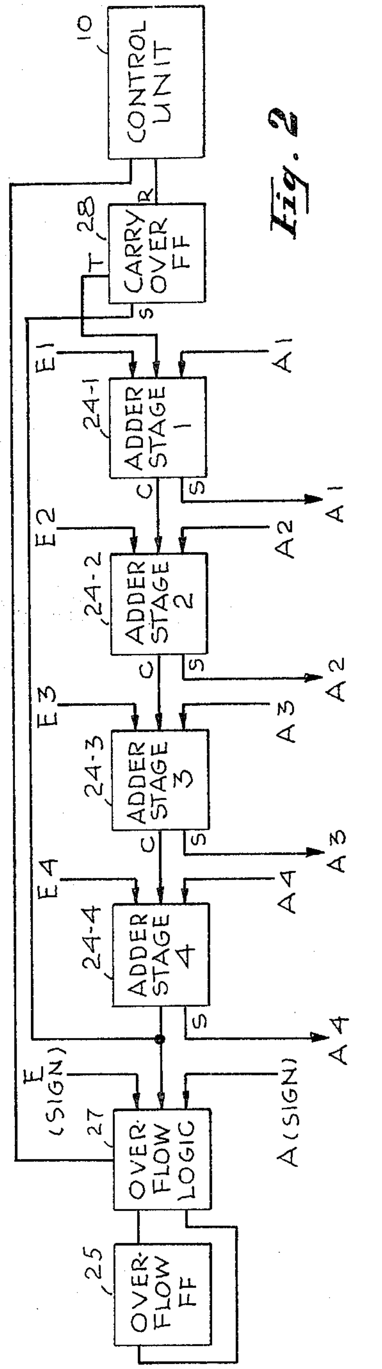

Other objects and advantages, which will subsequently become apparent, reside in the details of the circuitry and operations as more fully hereinafter described and claimed, further reference being made to the accompanying drawings forming a part hereof, wherein like identifying numerals refer to like parts throughout the several figures and in which FIGURE 1 is a block diagram of an embodiment of the invention; and FIGURE 2 is a more detailed diagram of the invention illustrating the carry over flip-flop logic employed.

Attention is now called to FIGURE 1 which comprises a block diagram showing the portion of a computer employing a preferred embodiment of the present invention. For purposes of simplifying the explanation of the invention, the computer will be assumed to be a parallel binary coded decimal computer having a four bit word length, although it is to be understood that the principles of the invention can be applied equally as well to any digital computer. Consequently, each data word represents one decimal digit and several data words can be cooperatively utilized to represent a decimal number having more than one digit.

The computer includes a control unit 10 comprising a logic structure which responds to instruction words accessed from the computer memory to cause other portions of the computer to perform operations such as arithmetic operations; e.g. addition. In order to perform an addition operation, the control unit 10 in response to the application thereto of an instruction word must instruct memory control logic 12 to read out of the computer memory 14 the digits of the two numbers which are to be added. The instruction word must specify the addresses in memory of the digits and is explained in greater detail below, the significance of the digits, i.e. least, intermediate or most. The least significant word or decimal digit of a first of the numbers is initially read out of the computer memory 14, into a register 16, designated as E, and transferred to a register 20, designated as A. The transfer in and transfer out operation of the E register 16 is controlled by E register control logic 18, which in turn is controlled by the control unit 10. The transfer in and transfer out operation of the A register 20, is under control of A register control logic 22, which is also controlled by control unit 10. The least significant digit of the second number to be added is subsequently transferred out of the computer memory 14 into the E register 16.

Both the E and A registers 16, 20 are connected so as to enter the digits therein into the least significant stage of a conventional full adder circuit 24 which can include a plurality of stages each having three inputs and a sum and carry output. The full adder circuit is under control of the adder control logic 26, which in turn is controlled by the computer control unit 10. The full adder 24 operates to add the digits in the E register 16 and the A register 20 and to then insert the sum into the A register 20, under the control of the control unit 10. The sum in the A register 20 replaces the digit which was there previously.

If, as a result of the addition, the adder circuit 24 produces a carry digit on the carry output line of the most significant adder stage, a carry over flip-flop 28 is set to store this digit. Carry over flip-flop 28 is also connected to the flip-flop control logic 30 which in turn is connected to control unit 10, this connection permitting the control unit 10 to reset or clear the carry over flip-flop 28 prior to the addition of the two least significant digits. The output of carry over flip-flop 28 is connected to one input of the least significant adder stage.

The next digits of the two numbers to be added are then successively read out of the computer memory 14, and are respectively entered into the E register 16 and the A register 20. Then, upon instruction from the control unit 10, the adder 24 adds together the contents of the E register and the A register as well as the carry over flip-flop 28. No preliminary sensing of the carry over flip-flop by the program is required. The full adder 24 then, as previously described, enters the sum into the A register 20 and the next carry over digit, if there is one, into the carry over flip-flop 28. Addition can then proceed in the manner described until all the digits of the two numbers being added have been added together. No more time is taken to add the two numbers and the generated carries than is taken to add two numbers without carries. By virtue of requiring that the adder circuit 24 be a full adder, and by clearing the carry over flip-flop only prior to the addition of the two least significant digits and always adding the contents of the carry over flip-flop to the two numbers being added, time is saved and considerable additional hardware is eliminated.

To this point, the handling of the least significant digits and digits of intermediate significance have been considered and it should be apparent that their handling differs only to the extent that the carry over flip-flop is precleared only prior to adding the least significant digits. The most significant digits are handled in the same manner as the digits of intermediate significance, but, however, an overflow is generated if the sum of the two numbers being added has a greater number of significant digits than either of the numbers. An overflow flip-flop 25 controlled by overflow logic 27 is provided to permit the generation of the overflow. The overflow logic 27 is controlled by control unit 10 and only permits the generation of an overflow (i.e. setting the overflow flip-flop) when the most significant digits are being applied to the adder 24. In an addition system capable of adding signed numbers (i.e. positive and negative) whether or not the overflow flip-flop is set depends upon the signs of the numbers being added and whether or not a carry results from the addition of the most significant digits.

One conventional technique for storing the sign of a number is to dedicate the most significant bit of the number for this purpose. Accordingly, in situations as herein described where several computer words are used to represent a single number, the sign can be stored in the most significant digit of the number. Accordingly, when the most significant digits are in the A and E registers 16 and 20, the information in the most significant bit positions thereof is applied to the overflow logic 27 along with the carry, if any, out of the full adder 24.

The invention has been described to this point with the aid of a block diagram only, inasmuch as the internal details of the various blocks are well known to persons skilled in the computer art. Although not shown, it is pointed out that the operation of all of the components can be synchronously governed by the output of a conventional digital clock. For a more detailed understanding of the operational relationships between the various blocks, reference can be made to U.S. Patent Application Serial No. 164,660 filed January 8, 1962, by Schneberger et al. and assigned to a common assignee.

Reference is now made to FIGURE 2 which shows the specific details of the carry over flip-flop 28, the full adder circuit 24 and the overflow flip-flop 25. By way of illustration, four stages respectively 24–1, 24–2, 24–3 and 24–4, of the full adder circuit are shown. Each stage has three inputs. A first input is received from the corresponding stage of the E register. A second input is received from the corresponding stage of the A register. The third input is the carry input from a preceding stage. In the case of the first adder stage 24–1, the carry input is received from the carry flip-flop 28. The output of each one of the adder stages consists of a sum and carry. The sum output is returned to the corresponding stage of the A register to replace the decimal digit which has been added. The carry output of the last stage 24–4 of the adder is applied to the set input terminal of the carry over flip-flop designated as S. The true output terminal of the carry over flip-flop is designated as T and is connected to the carry input of adder stage 1.

Accordingly, it has been shown that the addition scheme described in accordance with this invention allows the generation of multiple word sums without requiring a program to handle inter-word carries. The arrangement in accordance with this invention is applicable to adders of any size from serial, single bit adders up to parallel, multi stage ones.

It has additionally been shown that two basic instructions must be provided to the control unit 10 in order to control the carry over flip-flop 28 to develop the multiple words sums. The first instruction is the one which enables the flip-flop 28 to be cleared before adding, when the least significant digits of two numbers are to be added. The second instruction is the one which permits the flip-flop 28 to automatically add its contents to the next word of the sum when most significant digits or digits of intermediate significance are to be added.

In addition to the two basic instructions utilized to control the carry over flip-flop 28, it has also been shown that the control unit 10 is responsive to a third instruction, applicable when the most significant digits are being added, to appropriately control an overflow flip-flop. In addition to these three instructions, the control unit 10 is also responsive to a fourth instruction, applicable when single word numbers are being added, to both clear the carry over flip-flop 28 and appropriately control the overflow flip-flop 25.

In order to illustrate the manner in which the control unit 10 operates, let it be assumed that two bits in the instruction word applied to the control unit 10 designate the type of addition to be performed. Further, it is arbitrarily defined that the four add instructions are represented by the codes presented in column 2 of the following table:

| (1) Add instruction | (2) Instruction word | | (3) Clear carry over FF | (4) Enable overflow logic |
|---|---|---|---|---|
| | Bit 1 | Bit 2 | | |
| (1) Least significant | 1 | 0 | 1 | 0 |
| (2) Intermediate significant | 0 | 0 | 0 | 0 |
| (3) Most significant | 0 | 1 | 0 | 1 |
| (4) Single word | 1 | 1 | 1 | 1 |

from columns 3 and 4 of the table it can be seen that control unit 10 must generate a signal to clear the carry over flip-flop 28 in response to the "add least significant" and "add single word" instructions, and that it must generate a signal to enable the overflow logic 27 in response to the "add most significant" and "add single word" instructions. It should be appreciated that a logical gating apparatus which functions in accordance with the operation described by the table, can be easily implemented utilizing conventional AND and OR gates.

The invention also finds utility in the generation of negative numbers represented in the two's complement number system since the carry over flip-flop 28 can be utilized to automatically add one to a number in one's complement form. By combining this step with the addition of two digits, an effective subtraction is efficiently accomplished.

From the foregoing, it should be readily appreciated that applicants have herein provided an improved arithmetic apparatus having as a significant feature thereof the ability to more efficiently handle carry digits.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The embodiments of the invention in which an exclusive property or privilege is claimed are defined as follows:

1. In an arithmetic system:
 a memory storing a plurality of multibit words;
 first and second registers each capable of storing one of said words;
 means for accessing selected words from said memory for storage in said first and second registers;
 a parallel adder circuit comprised of a plurality of ordered stages at least equal in number to the number of bits in each of said words and including a first stage having a carry input terminal and a last stage having a carry output terminal;
 means for simultaneously applying words stored in said first and second registers to said adder circuit;
 a carry flip-flop having an input terminal and an output terminal;
 means coupling said last stage carry output terminal to said carry flip-flop input terminal for storing therein a carry indication resulting from an application of words stored in said first and second registers to said adder circuit; and
 means coupling said carry flip-flop output terminal to said first stage carry input terminal for applying the content of said carry flip-flop to said adder circuit simultaneously with a subsequent application of words stored in said first and second registers to said adder circuit.

2. The arithmetic system of claim 1 including a control means for selectively clearing said carry flip-flop prior to an application of words stored in said first and second registers to said adder circuit.

3. In combination with memory storage means including a plurality of word storage locations wherein each location can store a multibit word representing either a least, intermediate, or most significant portion of a numerical quantity, arithmetic apparatus capable of adding first and second numerical quantities comprising:
 first and second registers each capable of storing one of said words;
 means for accessing from said memory storage means words comprising corresponding portions of said first and second numerical quantities;
 means for storing said accessed words in said first and second registers;
 a carry over flip-flop having an input terminal and an output terminal;
 a parallel adder having first and second sets of information input lines and including a carry output line and a carry input line;
 means for simultaneously applying said first and second registers to said first and second sets of input lines respectively and said carry over flip-flop output terminal to said carry input line; and
 means connecting said carry output lines to said carry over flip-flop input terminal for storing a carry indication in said flip-flop for subsequent application to said carry input line together with the subsequent application of said first and second registers to said first and second sets of input lines.

4. The combination of claim 3 wherein said arithmetic apparatus includes a control means and said memory storage means stores instruction words, said instruction words including information identifying the memory storage locations respectively storing said corresponding portions of said first and second numerical quantities and information identifying the significance of said corresponding portions;
 means applying said instruction words to said control means; and
 means connecting said control means to said carry over flip-flop for selectively clearing said flip-flop in response to the information in said instruction words identifying least significant portions prior to the application of said flip-flop output terminal to said carry input line.

5. The combination of claim 4 wherein said arithmetic apparatus further includes an overflow flip-flop; and logic means connecting said control means to said overflow flip-flop for selectively connecting the carry output line of said adder to the input of said overflow flip-flop in response to information in said instruction words identifying intermediate or most significant portions.

References Cited by the Examiner

UNITED STATES PATENTS

| | | | |
|---|---|---|---|
| 2,808,204 | 10/1957 | Geyer et al. | 235—175 |
| 2,952,407 | 9/1960 | Weiss et al. | 235—175 |
| 3,191,012 | 6/1965 | Fleisher et al. | 235—175 |
| 3,202,805 | 8/1965 | Amdahl et al. | 235—164 |

OTHER REFERENCES

"Synthesis of Electronic Computation and Control Circuits," Harvard University, TK 7870 H3, May 17, 1951, pp. 159–162.

MALCOLM A. MORRISON, *Primary Examiner.*

R. C. BAILEY, *Examiner.*

M. J. SPIVAK, *Assistant Examiner.*